United States Patent
North

[15] 3,650,241
[45] Mar. 21, 1972

[54] SPREAD APPLICATOR

[72] Inventor: Donald Edward North, 7 Rupert Terrace, Ascot, Queensland, Australia

[22] Filed: May 22, 1968

[21] Appl. No.: 731,131

[30] Foreign Application Priority Data

May 23, 1967 Australia ..........................22177/67

[52] U.S. Cl. ...................................118/2, 118/18, 118/25, 118/410
[51] Int. Cl. ........................................A21c 9/04, B05c 5/02
[58] Field of Search ...................118/24, 25, 18, 2, 410, 411, 118/DIG. 9; 271/37, 87

[56] References Cited

UNITED STATES PATENTS

| | | |
|---|---|---|
| 820,388 | 5/1906 | Carter....................................118/2 X |
| 2,299,326 | 10/1942 | Kiehn ....................................118/410 |
| 2,565,036 | 8/1951 | MacDonald ..........................118/236 |
| 2,844,373 | 7/1958 | Van Marle.............................271/87 |
| 2,851,003 | 9/1958 | Binsted et al. ..........................118/13 |
| 2,885,996 | 5/1959 | Simmonds .............................118/18 |
| 3,398,717 | 8/1968 | Paulsen................................118/410 X |

*Primary Examiner*—John P. McIntosh
*Attorney*—Holcombe, Wetherill & Brisebois

[57] ABSTRACT

A spread applicator having means for feeding slices a bread past an applicator containing spread and arranged to dispense the spread onto the bread and for stacking the latter after the application of the spread.

4 Claims, 7 Drawing Figures

Inventor:
Donald E. North

By Cals Hein
Agent

SPREAD APPLICATOR

This invention relates to a spreader for butter, margarine and the like and may be used for filling sandwiches as well as for applying the spread to the bread.

The present invention provides a spread applicator comprising bread delivery feed means, a spread hopper, means to displace the spread to an applicator valve, a control member for opening and closing the applicator valve in response to the passage of a slice of bread past the applicator valve and means for collecting the bread with the spread applied thereon, characterized in that the means for collecting the bread includes a frame member for receiving the slices of bread, and a pusher plate which displaces each slice received from the applicator along the frame member.

The invention is hereinafter described by way of example with reference to the accompanying drawings in which.

Figure 1:
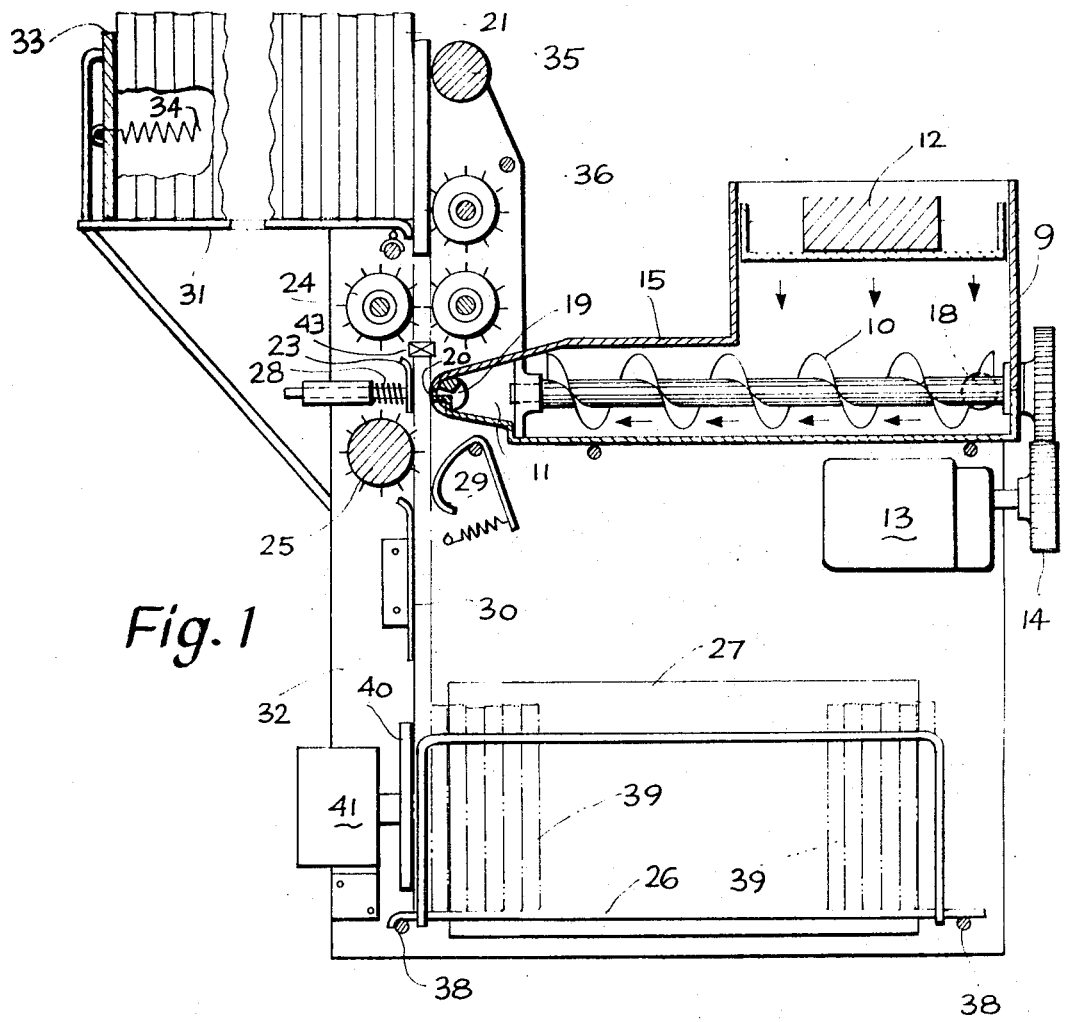
FIG. 1 is a cross section on plane 1—1 of FIG. 2, showing the spread applicator according to the invention.
Figure 3:
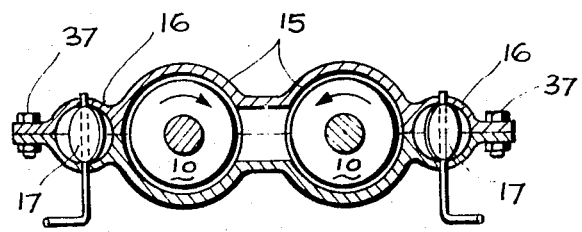
FIG. 3 is an enlarged cross section on the plane 3—3 of FIG. 2, of a feed-screw housing and by-pass tubes.
Figure 4:
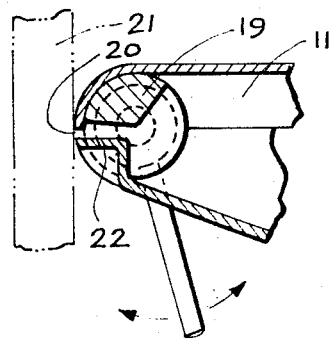
FIG. 4 is an enlarged sectional view of the nose portion of the applicator, showing the arrangement of the rotary gate valve of the device of FIG. 1.
Figure 2:
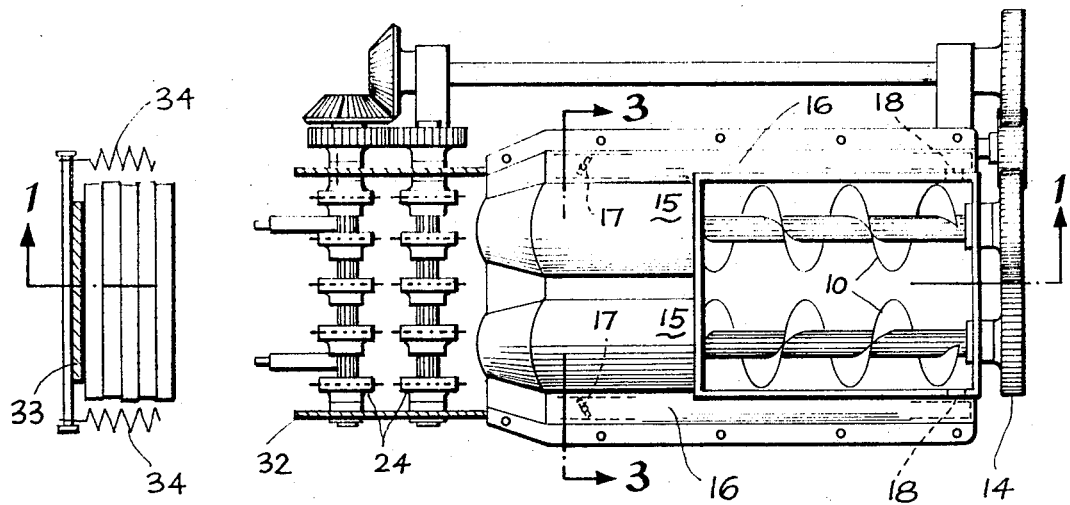
FIG. 2 is a part sectional plan view through feed wheels of the device of FIG. 1.
Figure 5:
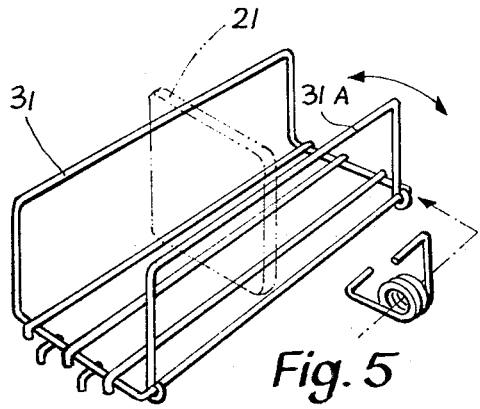
FIG. 5 is a perspective view of a delivery platform or magazine of the device of FIG. 1.
Figure 6:
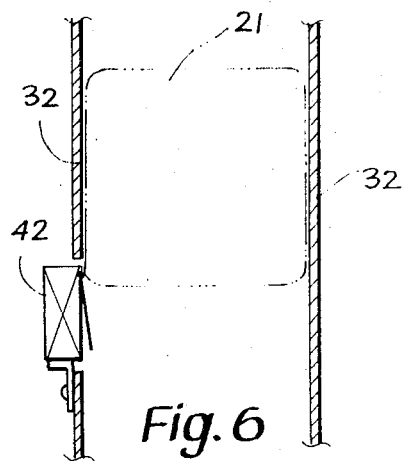
FIG. 6 is a part cross sectional view of part of FIG. 1, showing a slice of bread falling to actuate a micro-switch control.
Figure 7:
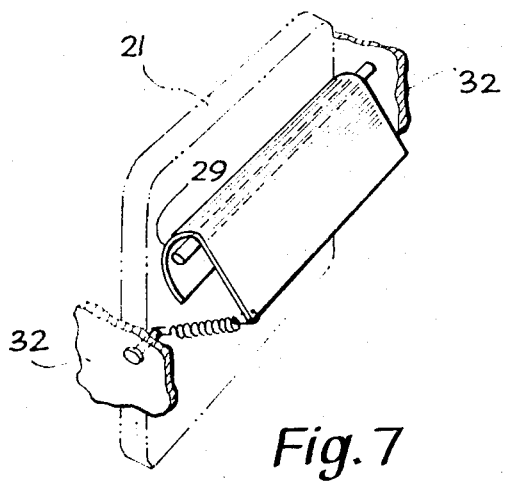
FIG. 7 is a perspective view of a spreading plate of FIG. 1.

A container or feed hopper 9 has a main portion for receiving spread, such as butter, margarine and the like, and horizontally disposed side-by-side twin feed-screws 10 for urging the spread towards an applicator 11. This is assisted by a weight 12 resting on the top surface of the spread. The feed-screws 10 are driven by an electric motor 13 and a suitable gearing 14. Parallel to and an integral part of a twin feed-screw housing 15, and on opposite sides of the screws 10, are two recirculating by-pass tubes 16, each fitted with a butterfly valve 17, and having openings 18 at both ends of the housing 15 to allow the spread to re-circulate from the front to the rear of the housing, to maintain an even consistency of the spread material.

A rotary gate or valve 19 in the applicator 11 is opened to allow the spread to be applied to the surface of a bread slice 21 through a narrow transverse slot 20 in the front end of the applicator 11 as the sliced bread is fed past the slot 20. The applicator 11 has a lip formation 22 directly below the transverse slot 20, and the amount of spread released is controlled by the before-mentioned rotary gate or valve 19 as the sliced bread 21 is fed downwardly between spring-loaded guide plates or fingers 23 and the lip 22.

The bread feeder or delivery means comprises a series of spiked feed rollers 24 and solid-core delivery rollers 25 and a gear driven from the motor 13. The lower delivery roller 25 has a solid core to deliver the sliced spread bread 21 onto a receiving platform, frame member or rack 26. The intermittent action of the rotary gate or valve 19 is linked to the butterfly valves 17 in the by-pass tubes 16 so that the spread will not be extruded through the transverse slot 20 until a slice of bread 21 is opposite the applicator 11, i.e. the rotary gate or valve 19 in the applicator 11 is closed and the butterfly valves 17 are open to enable free recirculation of spread when the valve 19 opens the butterfly valves 17 close so as to maintain pressure at the valve 19.

Guide plates 23 are fitted directly opposite the applicator 11 between the feed rollers 24, and a light helical spring 28 is provided to keep the surface of the bread 21 against the slot 20. This provides for an even distribution of spread on the bread surface as the same is moved past the applicator 11.

A pivoted spring-actuated smoothing scraper or spreader plate 29 is positioned a short distance below the rollers 25, and it functions to smooth any uneven distribution of spread that may occur on the bread surface. The bread in this position is backed by a fixed guide or backing plate 30.

A horizontally disposed upper bread delivery frame member or platform 31 of wire construction is detachably fitted to a frame 32 of the machine. One side 31A is spring-loaded to lightly grip the edges of sliced bread 21 which is automatically fed by the combined action of a feed plate 33 and helical tension springs 34. Ends of the latter are attached to the feed plate 33 and the other ends are secured to the machine frame 32, thus urging the sliced bread 21 against a feed roller 35 driven by a gear or chain from the motor and supported in bearings at the top of machine frame 32. By this arrangement the slices of bread 21 are fed downwardly and gripped by a spiked transfer roller 36 and passed between the pair of spiked feed rollers 24.

The receiving platform 26 has similar construction to the upper platform 31 and is supported on spacing rods 38 between the machine frame 32, to receive and automatically stack spread bread slices 39 one behind the other after they have passed through the machine. The stacked bread is displaced along the platform 26 by a pusher plate 40 attached to a solenoid 41 supported on machine frame 32 and operated by a micro-switch 42 contacted by the edge of the bread slice 21 being fed downwardly through the applicator. The applicator valve is opened and closed by a control member 43 responsive to the passage of a slice of bread past the valve. Any suitable known form of control member may be used.

A cut-out or observation hole 27 is provided in the frame 32 so that the operation of the machine may be visually checked.

For convenience in manufacture the twin feed-screw housing 15 is molded in two sections and secured together by bolts 37, and it is detachably mounted on the frame 32 so that it may be readily cleaned after use.

I claim:

1. A spread applicator comprising, in combination, a machine frame, bread delivery means disposed in said frame at an elevated location, a spread hopper in said frame, partly below and partly at the same level as said delivery means, an applicator formed in said spread hopper on the side of the latter facing said delivery means, having a transversal slot past which each bread slice moves in its path from said delivery means, means to displace spread to said applicator from said hopper, an applicator valve being opened and closed by a control member responsive to the passage of a bread slice past said applicator as the slice leaves said delivery means, and means for collecting the bread slices with the spread applied thereon, disposed in said frame at a level below that of said spread hopper, wherein said collecting means include a frame member for receiving the bread slices, and a reciprocable pusher plate which displaces each bread slice received from said applicator along said frame member.

2. The spread applicator as defined in claim 1, wherein said displacing means includes a twin feed-screw in said hopper, with cooperating recirculating tubes and valve means in said tubes which open to recirculate the spread when said applicator valve is closed.

3. The spread applicator as defined in claim 1, wherein said delivery feed means includes a second frame member having a spring-baised feed plate for advancing a stack of the bread slices, one at a time, to a transfer roller which transfers each slice in turn to feed rollers which move the bread past said applicator valve.

4. The spread applicator as defined in claim 1, further comprising a spiked delivery roller below said slot of the applicator, on one side of said bread-slice path, and a spring-biased spreader plate on the other side of said path, in operative relation with said delivery roller, wherein each bread slice after receiving the spread and before reaching said collecting means passes between said delivery roller and said spreader plate, the latter smoothing the applied spread on the bread slices.

* * * * *